Patented Nov. 20, 1928.

1,692,509

UNITED STATES PATENT OFFICE.

WERNER MERKI, OF BASEL, SWITZERLAND, ASSIGNOR TO THE FIRM OF SOCIETY OF CHEMICAL INDUSTRY IN BASLE, OF BASEL, SWITZERLAND.

MANUFACTURE OF PHYSIOLOGICALLY-ACTIVE SUBSTANCES FROM ORGANS.

No Drawing. Application filed January 26, 1928, Serial No. 249,780, and in Switzerland February 23, 1927.

My invention relates to the manufacture of physiologically active substances from female internal secretory organs, such as ovaries, corpus luteum, placenta, or the like.

In the hitherto usual processes for making active extracts from the internal secretory organs of females, such as ovaries, placenta, corpus luteum or the like, the fresh or dried comminuted organs have been extracted at a raised temperature by a solvent and if desired the crude extract thus obtained has been purified by suitable procedure. The usual comminution of the fresh organs by chopping obviously opens up the cells only in a very defective manner, so that during the following extraction the solvent can penetrate only in very limited degree into the interior of the cells, so that the yield during the extraction leaves much to be desired even when it is conducted at a raised temperature. If the organs are to be more finely comminuted it was necessary in the known processes first to dry them. The drying, however, even when conducted at the ordinary temperature, and particularly when a higher temperature is used, leads to more or less deeply seated fundamental changes in the cell substance, such as oxidation or decomposition, extending it may be to the active constituents themselves, or at all events giving rise to decomposition products in the extract which can be separated only with difficulty; the yield in pure active substance is consequently strongly depressed.

The improvement according to this invention consists in avoiding the disadvantages indicated in the preceding paragraph by exposing the fresh organs to a temperature low enough to cause them to become hard and finely pulverizing them in this condition; in this manner the cell walls are completely opened and the hypersensitive cell constituents protected, so that there is a particularly good yield of highly active extract from the powdered material.

This preliminary treatment causes such a fundamental opening up of the contents of the cells that when extraction with the usual solvents follows all the soluble constituents are easily dissolved, not only at raised temperature but even at the ordinary temperature, that is to say under conditions which permit a thorough protection of the sensitive substances.

The crude extracts thus obtained may be freed if necessary in the usual manner from ballast, such as phosphatides, cholesterol, cholesterol esters, fats and fatty acids.

If desired, a dehydration may be combined with the treatment at a low temperature by adding to the organ during the cooling or pulverization an agent that combines with water, such as calcined sodium sulfate, anhydrous calcium chloride, anhydrous calcium sulfate, or the like. Such an agent takes up water from the comminuted organ, so that by the subsequent extraction by means of substantially anhydrous solvents, such as ether, a water-free extract is obtained. The process, therefore, may avoid the usual drying operation and yet yield a product free from water without in any way damaging this product.

The process of the invention as compared with the known processes offers not only greater simplicity, but an improved yield in respect of both weight and effectivity.

The following examples illustrate the invention:—

*Example 1.*

1 kilo of fresh ovaries are immersed in carbonic acid snow and then ground together with the snow and 3 kilos of calcined sodium sulfate. The fine powder thus obtained is extracted repeatedly with ether in portions of 4 to 5 litres at the ordinary temperature. The filtered and united ethereal extracts are concentrated in a vacuum at a low temperature to about 50 cc. whereupon the liquid is mixed with 300 cc. of acetone and the mixture cooled to $-70°$ C. The precipitate, which is produced, is drained at low temperature and washed with acetone. The filtered solution in acetone-ether can be used either directly or after it has been freed from solvent by exposure to olive oil or sesame oil in a vacuum.

*Example 2.*

1 kilo of fresh placenta is ground, together with carbonic acid snow, and the solid powder thus obtained is extracted twice at ordinary temperature with 5 litres of absolute alcohol. The united, clear filtrates are evaporated at 20–25° C. in a vacuum and the alcohol completely expelled while water is added. The remaining aqueous emulsion is twice shaken with 1 litre of ether and the separated ethereal solutions are evaporated in a vacuum at 15° C. to about 50 cc. The residue thus obtained is further subjected to a precipitation by acetone and cooled to a low temperature as described in Example 1 and then worked up for obtaining a pure extract.

*Example 3.*

1 kilo of fresh ovaries are preliminarily treated as described in Example 1 (first sentence) and the fine powder thus obtained is extracted at —20° C. several times by means of 4-5 litres of acetone. On evaporating the acetone at low temperature in a vacuum, there is obtained directly a highly purified extract.

What I claim is:—

1. A process of extracting the internal secretory organs of females, wherein the fresh organs are cooled to such a low temperature that they become hard and in this condition are pulverized, whereupon the powder thus obtained is extracted with a suitable solvent.

2. A process of extracting the internal secretory organs of females, wherein the fresh organs are cooled to such a low temperature that they become hard and in this condition are pulverized with addition of an agent that combines with water, whereupon the powder thus obtained is extracted with a suitable solvent.

3. A process of extracting the internal secretory organs of females, wherein the fresh organs are cooled to such a low temperature that they become hard and in this condition are pulverized, whereupon the powder thus obtained is extracted with a suitable solvent, and the extract purified in the usual manner.

4. A process of extracting the internal secretory organs of females, wherein the fresh organs are cooled to such a low temperature that they become hard and in this condition are pulverized with addition of an agent that combines with water, whereupon the powder thus obtained is extracted with a suitable solvent, and the extract purified in the usual manner.

5. A process of extracting the internal secretory organs of females, wherein the fresh organs are mixed with solid carbon dioxide and then pulverized, whereupon the powder thus obtained is extracted with a suitable solvent.

6. A process of extracting the internal secretory organs of females, wherein the fresh organs are mixed with solid carbon dioxide and then pulverized with addition of an agent that combines with water, whereupon the powder thus obtained is extracted with a suitable solvent.

7. A process of extracting the internal secretory organs of females, wherein the fresh organs are mixed with solid carbon dioxide and then pulverized, whereupon the powder thus obtained is extracted with a suitable solvent, and the extract purified in the usual manner.

8. A process of extracting the internal secretory organs of females, wherein the fresh organs are mixed with solid carbon dioxide and then pulverized with addition of an agent that combines with water, whereupon the powder thus obtained is extracted with a suitable solvent, and the extract purified in the usual manner.

In witness whereof I have hereunto signed my name this 11th day of January, 1928.

WERNER MERKI.